US012750405B2

(12) United States Patent
Schwartz et al.

(10) Patent No.: US 12,750,405 B2
(45) Date of Patent: Sep. 29, 2026

(54) FRAMEWORK FOR AUTOMATED DATA-DRIVEN DETECTION ENGINEERING

(71) Applicant: Google LLC, Mountain View, CA (US)

(72) Inventors: Moses Daniel Schwartz, Clayton, CA (US); Kira Ann Quan, Longmont, CO (US); Joshua Atkins, South Lake Tahoe, CA (US); Ricardo Correa, Austin, TX (US); Nathaniel Benjamin Shar, Longmont, CO (US); Sara Ann Zukowski, Longmont, CO (US); Thomas Charles Henry Lyttelton, San Francisco, CA (US); Barbara Davilla, Austin, TX (US); Vidya Gopalakrishnan, Santa Clara, CA (US); Prerit Pathak, Mountain View, CA (US); Benjamin Henry Walter, Austin, TX (US); Michael Hom, Arlington, VA (US)

(73) Assignee: Google LLC, Mountain View, CA (US)

( * ) Notice: Subject to any disclaimer, the term of this patent is extended or adjusted under 35 U.S.C. 154(b) by 245 days.

(21) Appl. No.: 18/133,460

(22) Filed: Apr. 11, 2023

(65) Prior Publication Data

US 2024/0348649 A1 Oct. 17, 2024

(51) Int. Cl.
*H04L 9/40* (2022.01)
*G06F 21/55* (2013.01)
*G06F 21/57* (2013.01)

(52) U.S. Cl.
CPC .......... *H04L 63/20* (2013.01); *H04L 63/1425* (2013.01)

(58) Field of Classification Search
CPC ... H04L 63/20; H04L 63/1425; H04L 67/535; H04L 47/20; G06F 21/577
See application file for complete search history.

(56) References Cited

U.S. PATENT DOCUMENTS 8,667,556 B2 * 3/2014 Chang .................... H04L 63/20 709/224
8,903,593 B1 * 12/2014 Addepalli ............... G06F 9/542 701/30.6
10,459,827 B1 * 10/2019 Aghdaie ............. G06F 11/0766
10,997,312 B2 * 5/2021 Miao ...................... G16H 40/20
(Continued)

OTHER PUBLICATIONS

Wang et al., "An approach for cross-domain access control policy generation from reputation evaluation to trust management," 2013 International Conference on Information and Network Security (ICINS 2013) Year: 2013 | Conference Paper | Publisher: IET.*
(Continued)

*Primary Examiner* — Roderick Tolentino
(74) *Attorney, Agent, or Firm* — Lowenstein Sandler LLP

(57) ABSTRACT

A plurality of data sets characterizing prior intrusive activities with respect to computing resources associated with one or more entities are received at a security platform. One or more rule generation policies each pertaining to at least one type of intrusive activity are received at a security platform. The one or more rule generation policies are applied to the plurality of data sets characterizing the prior intrusive activities to generate a plurality of intrusive activity detection rules. The plurality of intrusive activity detection rules are caused to be used to detect subsequent intrusive activities.

20 Claims, 9 Drawing Sheets

(56) References Cited

U.S. PATENT DOCUMENTS

| | | | |
|---|---|---|---|
| 11,003,773 B1 | 5/2021 | Fang et al. | |
| 11,693,958 B1* | 7/2023 | Steiman ................ | G06F 21/554<br>726/23 |
| 2020/0053090 A1* | 2/2020 | Kliger ................... | H04L 63/107 |
| 2020/0242525 A1* | 7/2020 | Zaslavsky ................ | G06N 7/01 |
| 2020/0389472 A1* | 12/2020 | Drapeau ........... | B60W 60/0018 |
| 2020/0401697 A1 | 12/2020 | Smith | |
| 2022/0050897 A1* | 2/2022 | Gaddam ................ | G06N 3/006 |
| 2022/0164449 A1 | 5/2022 | Saxe | |
| 2023/0262093 A1* | 8/2023 | Gupta ................. | H04L 63/1425<br>726/1 |

OTHER PUBLICATIONS

Wu et al., “An automated security policy generation method based on rule-matching and machine-learning models,” 2024 International Conference on Advanced Control Systems and Automation Technologies (ACSAT) Year: 2024 | Conference Paper | Publisher: IEEE.*

Raff, Edward, et al. “Automatic Yara Rule Generation Using Biclustering,” Association for Computing Machinery (arxiv.org preprint), Sep. 6, 2020, 12 pgs.

Mcdonald, George, et al. “How artificial intelligence stopped an Emotet outbreak,” Microsoft Defender Security Research Team, Feb. 14, 2018, 8 pgs, https://www.microsoft.com/en-us/security/blog/2018/02/14/how-artificial-intelligence-stopped-an-emotet-outbreak/. Accessed Apr. 10, 2023.

International Search Report and Written Opinion for International Application No. PCT/US2024/023929, mailed Jun. 14, 2024, 13 Pages.

* cited by examiner

FRAMEWORK FOR AUTOMATED DATA-DRIVEN DETECTION ENGINEERING

TECHNICAL FIELD

Aspects and implementations of the present disclosure relate to computer security, and in particular to providing automatic rule generation and data-driven detection engineering for detecting intrusive activity with respect to computing resources.

BACKGROUND

Computing resources such as data centers and cloud computing platforms may be susceptible to intrusive activity (e.g., malware, network-based attacks). Intrusive activity can lead to interruption or inefficient operation of computing resources, which can be problematic for owners and operators of computing resources. In extreme cases, intrusive activity can damage computing resources or data stored thereon, potentially causing substantial financial loss and other losses and liabilities for the owners and operators of computing resources.

Security platforms typically have intrusive activity notification mechanisms in place that alert clients when potential intrusive activity is detected. The intrusive activity can then be mitigated, e.g., by blocking an intrusive file from being downloaded, stopping intrusive processes that are running, etc. Detection engineering in conventional security platforms is often a manual and time-consuming process for security professionals, which can result in human errors and can strain the human resources of security teams, thereby decreasing the overall effectiveness and threat coverage of the security platform.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for automated data-driven detection engineering for security platforms. In an implementation, a method includes receiving, at a security platform, a plurality of data sets characterizing prior intrusive activities with respect to computing resources associated with one or more entities. The method further includes receiving, at the security platform, one or more rule generation policies each pertaining to at least one type of intrusive activity. The method further includes applying the one or more rule generation policies to the plurality of data sets characterizing the prior intrusive activities to generate a plurality of intrusive activity detection rules. The method further includes causing the plurality of intrusive activity detection rules to be used to detect subsequent intrusive activities.

In some embodiments, a method further includes testing a rule of the plurality of intrusive activity detection rules on a test data set to determine an intrusive activity detection precision metric, determining that the rule does not meet a precision threshold criterion, and queueing the rule for security analysis by a user.

In some embodiments, a method further includes receiving, at the security platform, a plurality of updated data sets characterizing the prior intrusive activities. The method further includes applying the one or more rule generation policies to the plurality of updated data sets characterizing the prior intrusive activities to generate a plurality of updated intrusive activity detection rules. The method further includes causing the plurality of updated intrusive activity detection rules to be used to detect subsequent intrusive activities. The plurality of updated data sets characterizing the prior intrusive activities may comprise user feedback regarding one or more alerts generated by the plurality of intrusive activity detection rules.

In some embodiments, each of the plurality of data sets characterizing prior intrusive activities comprises at least one of: a set of time series log data associated with the prior intrusive activities, a malware binary pattern associated with the prior intrusive activities, or a user-generated template representing the prior intrusive activities.

In some embodiments, each of the plurality of data sets characterizing prior intrusive activities comprises a set of time series log data coupled with associated intrusive activity detections from an external intrusive activity detection tool.

In some embodiments, each of the plurality of data sets characterizing prior intrusive activities comprises a plurality of source rules in a first format. The plurality of intrusive activity detection rules are in a second format. The one or more rule generation policies translate the plurality of source rules in the first format to the plurality of intrusive activity detection rules in the second format.

In some embodiments, each of the one or more rule generation policies comprises an algorithm or heuristic relating the at least one type of intrusive activity to at least one type of intrusive activity detection rule.

In some embodiments, at least one of the plurality of intrusive activity detection rules corresponds to a machine learning model. At least one of the one or more rule generation policies defines a set of features and respective labels in the plurality of data sets characterizing prior intrusive activities that are to be used to train the machine learning model. Each label of the respective labels indicates presence or absence of intrusive activity in one or more corresponding features of the set of features. Applying the one or more rule generation policies to the plurality of data sets characterizing prior intrusive activities comprises training the machine learning model using training data comprising the set of features representing training inputs and the respective labels representing target outputs for the training inputs. Causing the plurality of intrusive activity detection rules to be used to detect subsequent intrusive activities may comprise applying the trained machine learning model to a new data set characterizing a new activity and obtaining an output of the trained machine learning model indicating whether the new activity is intrusive.

In some embodiments a computer-readable storage medium (which may be non-transitory computer-readable storage medium, although the invention is not limited to that) stores instructions which, when executed, cause a processing device to perform operations comprising a method according to any embodiment or aspect described herein.

In some embodiments a system comprises: a memory; and a processing device operatively coupled with the memory to perform operations comprising a method according to any embodiment or aspect described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1A:
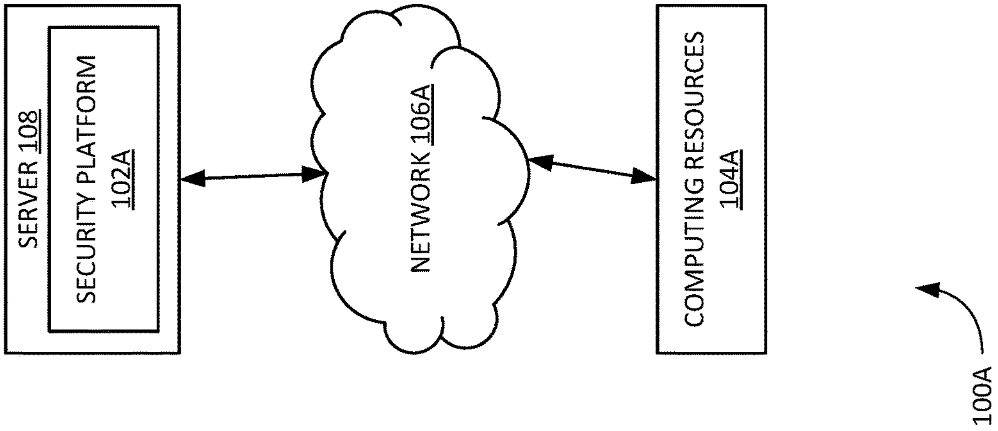
FIG. 1A-C illustrate example system architectures, in accordance with at least one embodiment of the present disclosure.

Aspects of the present disclosure relate to providing automatic rule generation and data-driven detection engineering for detecting intrusive activity with respect to computing resources. Computing resources may include, for example, servers, data centers, and cloud computing resources. Various computing resources may be susceptible to intrusive activity. Examples of intrusive activity include installation or operation of malware (e.g., malicious software), accessing or attempting to access computing resources without permission or authorization, modifying or exfiltrating data stored on computing resources without permission or authorization, exhausting computing resources (e.g., a denial-of-service attack), and other forms of unwanted activity. Intrusive activity is often problematic for owners and operators of computing resources because the intrusive activity can lead to interruption or inefficient operation of computing resources, or in extreme cases, substantial financial loss and liabilities. Malware is used herein as an example of intrusive activity, but intrusive activity often involves many other components such as those mentioned above, which are also within the scope of the present disclosure.

A security platform may provide services for detecting intrusive activity with respect to computing resources, enabling timely mitigation before the intrusive activity causes significant harm. For example, a security platform may receive data from computing resources (e.g., system event logs or new files inbound from a network connection) and analyze the data for signs of intrusive activity. Detection rules may associate patterns in the data with different types of intrusive activity, and rule evaluation engines may evaluate rules on new data. Upon evaluating a rule and detecting potential intrusive activity, the security platform can issue an alert to the computing resources (e.g., via an API) or the owners and operators of the computing resources (e.g., via email). The intrusive activity can then be automatically or manually mitigated in a timely manner, such as by blocking an intrusive file from being downloaded, stopping intrusive processes that are running, etc. Security information and event management (SIEM) products are examples of security platforms and may include software, hardware, and managed service components.

In conventional security platforms, detection engineering and detection rule development is often a manual and time-consuming process. For example, a skilled security professional (e.g., a security researcher) may expend considerable time manually analyzing data sets such as time series event logs or malware binary samples to identify patterns and commonalities that can be used to detect an instance or class of intrusive activity. The security professional can then craft one or more detection rules that are responsive to the same patterns in live data (e.g., client data) and generate appropriate alerts. This manual process is prone to error and may require additional time-consuming testing and verification of hand-crafted rules before the rules are deployed into production (e.g., evaluated on live data or client systems), causing needless consumption of computing resources allocated to support such additional testing and verification operations. The time-consuming nature of conventional detection engineering strains the human resources of security teams, which may lead to neglect of old production rules as security professionals focus on developing new rules to keep pace with new threats. As a result, production rules can be difficult to maintain and update, and old rules can become stale when they no longer provide appropriate coverage for evolving types of intrusive activity. Furthermore, user-generated rules may be sub-optimal with respect to computing resources consumed when applying the rules to live data. User-generated rules may be crafted in ways that consume excess CPU, memory, or other resources, and user-generated rules may also have overlapping threat coverage that results in redundant computation. These challenges decrease the overall efficiency, effectiveness, and threat coverage of the security platform. In some situations, security professionals may find it more efficient to write a bespoke script or program to automate aspects of this manual process, but the scripts themselves require updating and maintenance as systems and data change, further contributing to the above-mentioned problems.

Another challenge in conventional security platforms relates to harnessing detection rules in disparate formats. For example, a security platform may have access to external detection rules or external data sets from other security platforms (e.g., via licensing, acquisition, or shared resources), but these external detection rules may be incompatible with the security platform's internal rule format or platform architecture. In another example, a client may wish to migrate from one security platform to another and bring their customized rules with them. In these situations, security professionals often should manually translate each external rule to the internal rule format and perform relevant testing and verification, which is a time-consuming process that also results in consumption of additional computing resources. In another example, security professionals may only have access to the input data sets and output alerts of an external security platform, while the underlying detection rules are inaccessible. In these situations, security professionals should perform the manual analysis process described above to reproduce the output of the external detection rule for the same input data sets. These challenges hinder the benefits that would otherwise be achieved by combining the resources of various security platforms.

Aspects of the present disclosure address the above and other deficiencies by providing frameworks for automatic and computer-aided management of data sets, rules, and rule generation, including maintenance and updating of existing rules and data sets and support for use of trained machine learning models. Security platforms and other systems or services utilizing the techniques described herein may include a data set generator and other data set management tools to curate data sets from raw data sources and manage and update data sets throughout their useful life. Security platforms may also include a rule generation engine, which applies rule generation policies to data sets to automatically generate detection rules. Generated rules may undergo automated testing against test data sets, and successful rules may be automatically moved to a production environment. Unsuccessful rules may be queued for analysis by security professionals. Security platforms may track relationships between rule generation policies, data sets, and generated rules, such that if any of these components change (e.g., are modified or updated), the security platform will automatically run the rule generation process again to keep the platform up to date. In some embodiments, other management tools can be used for managing rule generation policies, data sets, and generated rules in development or in deployment.

In at least one embodiment, data sets conducive to automatic rule generation are provided. Data sets may be generated or received from internal or external sources, such as a data set generator or a user (e.g., a security professional or a client of a cloud platform). Data sets may vary in structure, scope, and content. For example, data sets may encompass specific types of intrusive activity or specific operating systems or environments. Data sets may include data such as logs, binaries, allow/deny lists, configurations, and rules. Data sets may be curated or non-curated and annotated or non-annotated. Data sets may be managed by the security platform. For example, when a data set is changed or added, the security platform may automatically update dependent detection rules. Data sets may be automatically linked to generated detection rules (e.g., using hashes) such that detection rules can be identified and managed with respect to a related data set or vice versa.

In at least one embodiment, rule generation policies are provided. A rule generation policy may be a descriptive document or an executable program that include mappings or transformations from data sets to detection rules. Rule generation policies may be provided by users (e.g., security professionals) and may be associated with specific data sets or classes of data sets. Rule generation policies may define many-to-one, one-to-many, and many-to-many mappings of data sets and/or data points to generated rules. An example rule generation policy may define translation of rules in one format to rules in another format. Another example rule generation policy may define parameters and/operations for training a machine learning model to identify intrusive activity using a training data set, and the model may be embedded in a generated rule. As with data sets, rule generation policies may be managed by the security platform. When rule generation policies change, dependent rules may be automatically updated. Rule generation policies may be automatically linked to generated detection rules and/or data sets (e.g., using hashes) such that detection rules and/or data sets can be identified and managed with respect to a related rule generation policy or vice versa.

In at least one embodiment, testing infrastructure is provided for automatically testing generated detection rules. Testing may use test data sets or live data, and test data may be previously seen or unseen with respect to the detection rules under test. Testing infrastructure may provide unit testing capabilities, which may ensure that generated detection rules provide adequate threat coverage and prevent undetected lapses or reductions in threat coverage. Testing infrastructure may provide comparisons of testing metrics for different versions of data sets, rule generation policies, and detection rules. Testing infrastructure may include multi-stage testing as well as prioritized or unprioritized queueing of some rules for user review. Testing infrastructure may also test performance and efficiency of detection rules with respect to computing resources such as memory and CPU utilization.

Accordingly, security platforms using the techniques described herein can provide improved accuracy and efficiency when detecting intrusive activity with respect to computing resources. Automatically generated rules, such as rules incorporating ML models, may provide improved threat coverage while reducing false positives. Security platforms may provide continuity of threat coverage by automatically updating and testing generated rules. Automatic rule generation techniques may also provide optimized rules that use computing resources more efficiently than rules generated with conventional techniques. Rule evaluation engines may consume fewer computing resources on average with optimized rules. Furthermore, security professionals can work at a higher level of abstraction, focusing on curating data sets and developing rule generation policies rather than developing and maintaining individual rules. Thus, a security platform may experience reduced operating costs and improved latency and throughput, which may benefit clients as well and increase trust in the security platform.

Figure 1B:
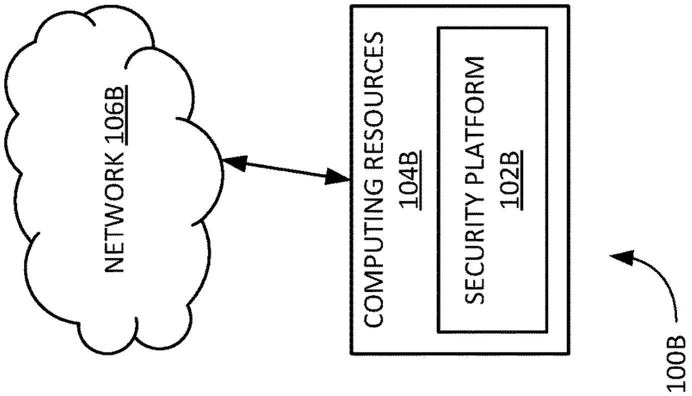
Figure 1C:
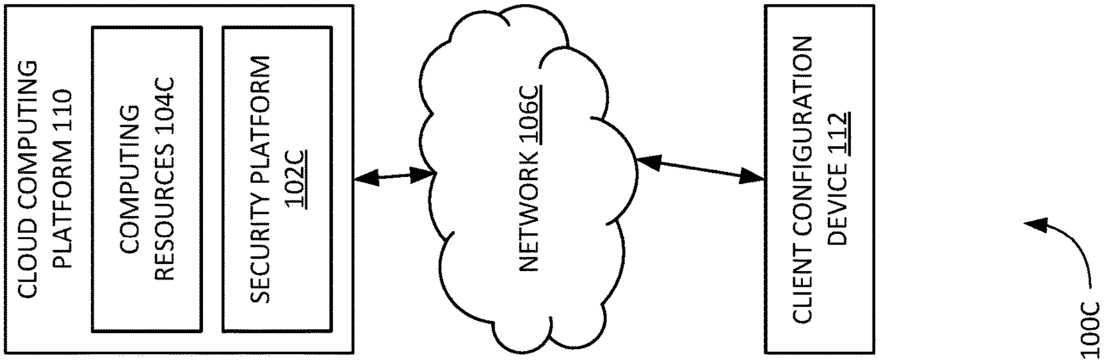

FIGS. 1A-C illustrate example system architectures 100A-C, in accordance with at least one embodiment. The system architectures 100A-C (also referred to as "system" herein) include at least a security platform (e.g., security platforms 102A-C) and computing resources (e.g., computing resources 104A-C). Security platforms 102A-C and computing resources 104A-C may be connected to networks, such as networks 106A-C. In implementations, networks 106A-C can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Figure 7:
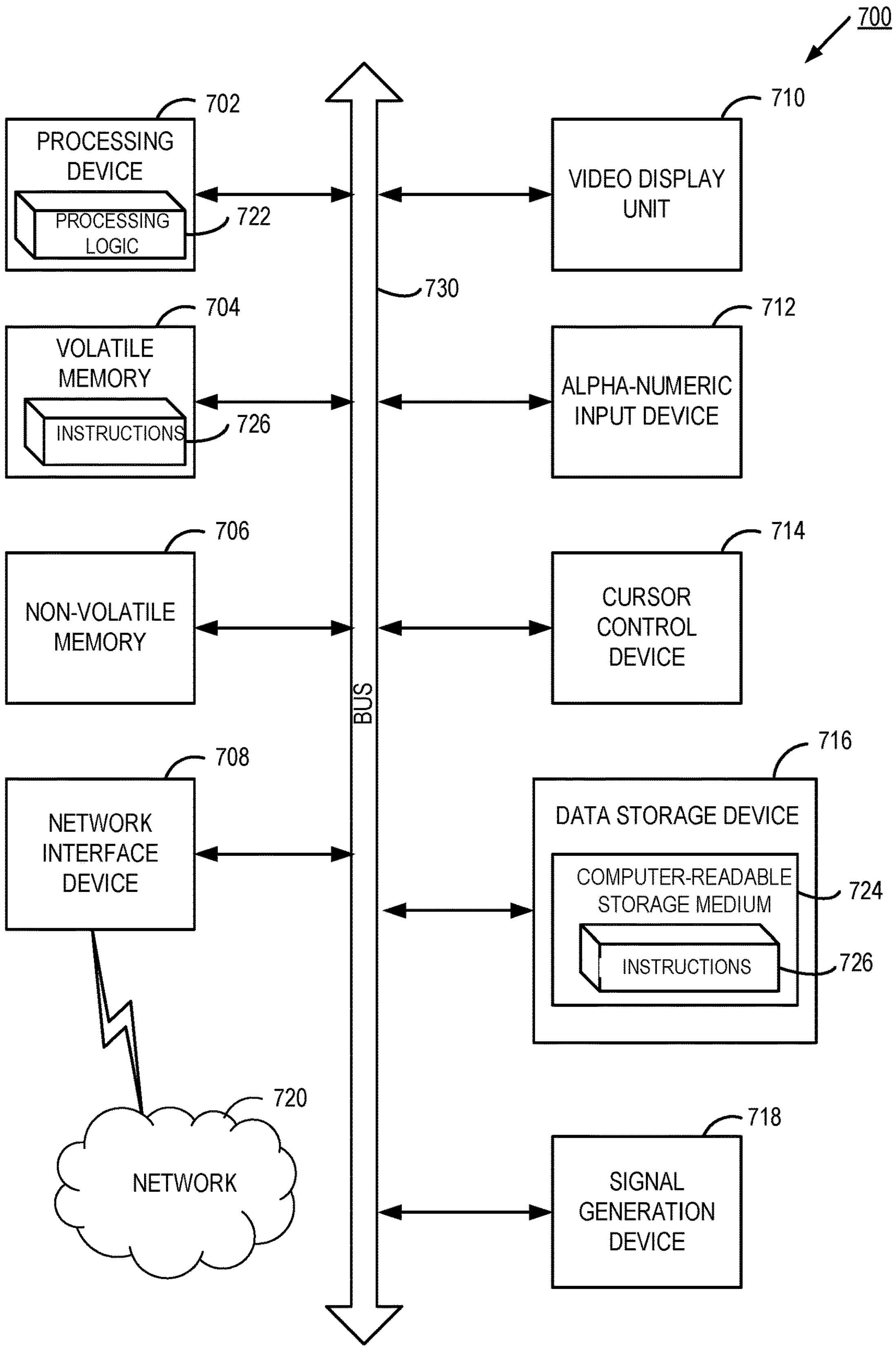
FIG. 7 is a block diagram illustrating an exemplary computer system, in accordance with at least one embodiment of the present disclosure.

Computing resources 104A-C may include one or more processing devices, volatile and non-volatile memory, data storage, one or more input/output peripherals such as network interfaces. FIG. 7 illustrates an example architecture of computing resources. In some embodiments, computing resources 104A-C may be singular devices such as smartphones, tablets, laptops, desktops, workstations, edge devices, embedded devices, servers, network appliances, security appliances, etc. In some embodiments, computing resources 104A-C may comprise multiple devices of similar or varying architecture such as computing clusters, data centers, co-located servers, enterprise networks, geographically disparate devices connected via virtual private networks (VPNs), etc. In some embodiments, computing resources 104A-C may comprise hardware devices such as those just described, virtual resources such as virtual machines (VMs) and containerized applications, or a combination of hardware and virtual resources. In some embodiments, computing resources may be associated with one or more entities. For example, an entity may own or lease hardware devices such as a server or a data center. In another example, a client entity may lease virtual resources (e.g., a VM) from a provider entity. The provider entity may provision the virtual resources (along with virtual resources associated with other client entities) on hardware devices that the provider entity owns or leases itself.

Security platforms 102A-C may provide security services for detecting intrusive activity with respect to computing resources 104A-C, such as scanning logs from computing resources 104A-C to detect signs of intrusive activity or scanning files (e.g., email attachments) from computing resources 104A-C to detect malware. Security platforms 102A-C may issue alerts and/or take other actions upon detecting intrusive activity. In some embodiments, security platforms 102A-C may include hardware devices or appliances (e.g., such as the computer system of FIG. 7), software applications, managed services, combinations of the above, etc. Security platforms 102A-C may include one or more hardware or software interfaces for communicating with users, computing resources 104A-C, entities associated with computing resources 104A-C, and other relevant parties. For example, security platforms 102A-C may include an application programming interface (API) for receiving data (e.g., logs and files) from and sending alerts to computing resources 104A-C. As a further example, security platforms 102A-C may provide graphical user interfaces (GUIs), command line interfaces (CLIs), or APIs for interacting with other platforms, systems, and/or users such as security professionals. As a further example, security platforms 102A-C may be configured to automatically send alert messages (e.g., emails, text messages, etc.) to users and/or entities associated with computing resources 104A-C. In some embodiments, interfaces such as those described above may utilize one or more hardware communication channels or protocols such as Ethernet, USB, PCIe, UART, I2C, SPI, etc. Users may interact with security platforms 102A-C to create new data sets and rule generation policies, to automatically generate and test intrusive activity detection rules, and to move rules to and from a production environment where the rules may be used to detect subsequent intrusive activity. Automatic rule generation at a security platform is further described with respect to FIG. 2.

Referring to FIG. 1A and example system architecture 100A, security platform 102A and computing resources 104A may be physically or virtually distinct from each other and communicatively connected by network 106A. For example, computing resources 104A may be a data center at a first geographical location, and security platform 102A may be a software application residing on server 108 at a second geographical location. Security platform 102A and computing resources 104A may be associated with the same entity or with different entities. For example, computing resources 104A may be associated with a client entity and security platform 102A may be associated with a provider entity. The client entity may subscribe to the provider entity's security service and configure computing resources 104A to periodically send data to security platform 102A for analysis. The provider entity may include one or more users (e.g., security researchers, security analysts, security engineers, or other security professionals employed by the provider entity) to develop, configure, and/or maintain the analysis capabilities of security platform 102A, and the provider entity may configure security platform 102A to send alerts to computing resources 104A, the client entity, and/or the users in response to detecting intrusive activity. Security platform 102A may include an interface for users associated with the client entity (e.g., security researchers employed by the client entity) to configure security platform 102A as well. Cloud-based SIEM providers and software-as-a-service SIEM providers are examples of provider entities.

Referring to FIG. 1B and example system architecture 100B, security platform 102B may be a component of computing resources 104B. For example, computing resources 104B may be a data center (connected to network 106B, e.g., the Internet), and security platform 102B may be a server, virtual machine, containerized application, or other hardware or software component housed within the data center. A standalone SIEM product that may be installed on-premises at a data center is an example of security platform 102B. A SIEM vendor may provide initial configuration for the SIEM product. As described with respect to FIG. 1A, security platform 102B may receive data from and issue alerts for computing resources 104B, but without a need for communication over network 106B. An entity associated with computing resources 104B may own or lease/license the hardware or software components of security platform 102B. The entity associated with computing resources 104B may include one or more users (e.g., security researchers employed by the provider entity) to develop, configure, and/or maintain the analysis capabilities of security platform 102B (in addition to any initial configuration and support provided by a vendor of security platform 102B).

Referring to FIG. 1C and example system architecture 100C, security platform 102C and computing resources 104C may be components of a computing platform such as cloud computing platform 110. A provider entity associated with cloud computing platform 110 may offer to lease computing resources such as hardware devices, virtual machines, etc., and may provide security platform integrations in association with the leased computing resources. In some embodiments, computing resources 104C and/or security platform 102C may be distributed across multiple hardware devices (e.g., within a data center or across disparate geographical locations) and may be communicatively connected via internal networks (not depicted), external networks such as network 106C, or a combination thereof. The provider entity may include various users (e.g., security researchers and other professionals/employees) to manage computing resources and security platform(s) of cloud computing platform 110. A client entity may provision computing resources 104C along with security platform 102C (e.g., simultaneously or at different times). In some embodiments, cloud computing platform 110 may provide dedicated security platforms 102C for each client entity (each client entity provisioning their own dedicated computing resources 104C). In some embodiments, cloud computing platform 110 may serve all client entities with a single security platform 102C. A client may use client configuration device 112 to communicate with cloud computing platform 110, provision computing resources 104C, and configure security platform 102C. Client configuration device 112 may be a hardware device such a laptop or a software application such as a web portal. While not depicted in FIGS. 1A-B, one or more client configuration devices such as client configuration device 112 may be used to configure computing resources 104A-B and security platforms 102A-B of example system architectures 100A-B.

In some embodiments, a system architecture may differ from example system architectures 100A-C and may include more or fewer components than those described with respect to example system architectures 100A-C. For example, a system architecture may include a security platform as a component of the computing resources (e.g., as described with respect to FIG. 1B) as well as an additional security platform connected over a network (e.g., as described with respect to FIG. 1A). In this example, an entity associated with the computing resources may desire benefits associated with having multiple security platforms, such as enhanced threat coverage or redundancy. Other system architectures are within the spirit and scope of the disclosure.

Figure 2:
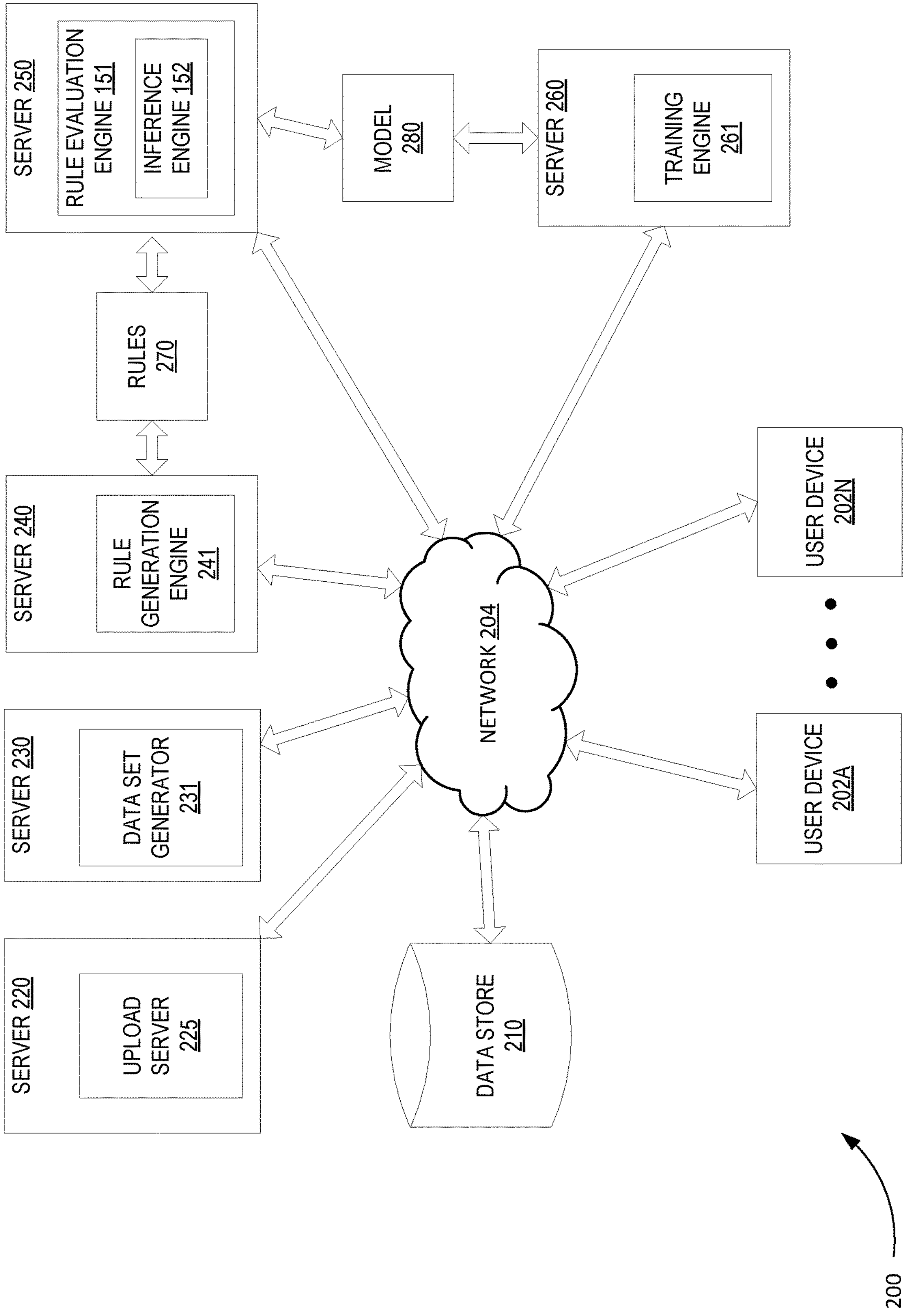
FIG. 2 illustrates an example security platform architecture that provides automatic rule generation and data-driven detection engineering in accordance with at least one embodiment.

FIG. 2 illustrates an example security platform architecture 200 providing automatic rule generation and data-driven detection engineering in accordance with at least one embodiment. In some embodiments, security platform architecture 200 may correspond to security platforms 102A-C of FIG. 1. Security platform architecture 200 includes one or more servers 220, 230, 240, 250, and 260, a data store 210, and user devices 202A-N connected to network 204. Each of servers 220, 230, 240, 250, and 260 may be a rackmount server, a router computer, a personal computer, a portable digital assistant, a mobile phone, a laptop computer, a tablet computer, a netbook, a desktop computer, a virtual machine, etc., or any combination of the above. In some embodiments, one or more of servers 220, 230, 240, 250, and 260 may be combined into a single server providing all of the components of the individual servers depicted in FIG. 2. Network 204 may be a public network (e.g., the Internet), a private network (e.g., a local area network (LAN) or a wide area network (WAN)), or a combination thereof. In some embodiments, network 204 may be a physical or virtual interconnect within a single server providing all of the components of one or more of servers 220, 230, 240, 250, and 260. For example, network 204 may be a PCIe bus, a messaging system, or an API. In some embodiments, network 204 may correspond to networks 106A-B of FIG. 1.

User devices 202A-N may be personal computers (PCs), laptops, mobile phones, tablet computers, digital assistants, servers, networking equipment, firewalls, other networking or security appliances, or any other computing devices. The computer system of FIG. 7 may be an example of such a computing device. User devices 202A-N may run an operating system (OS) that manages hardware and software of user devices 202A-N. User devices 202A-N may be used by users such as security professionals, owners and operators of computing resources, and other types of users described with respect to FIG. 1. In some embodiments, user devices 202A-N may upload data sets, information identifying data sources, data from the data sources, and/or rule generation policies to upload server 225 of server 220. In some embodiments, user devices 202A-N may configure components of servers 220, 230, 240, 250, or 260. In some embodiments, user devices 202A-N may correspond to client configuration device 112 of FIG. 1.

Data store 210 is a persistent storage that is capable of storing security platform content such as data sources, data sets, rule generation policies, rules, machine learning models, configurations and settings, etc. Data store 210 may be hosted by one or more storage devices, such as main memory, magnetic or optical storage-based disks, tapes or hard drives, NAS, SAN, and so forth. In some embodiments, data store 210 may be a network-attached file server. In some embodiments, data store 210 may be some other type of persistent storage such as an object-oriented database, a relational database, and so forth. In some embodiments, data store 210 may be hosted on or may be a component of one or more of servers 220, 230, 240, 250, and 260. In some embodiments, data store 210 may be provided by a third-party service such as a cloud platform provider.

Server 230 includes data set generator 231 that is capable of generating data sets from one or more data sources. Data set generation processes are further described with respect to FIGS. 3 and 4A-E. Data set generation may be automatic or may involve interaction with users, e.g., via user devices 202A-N (e.g., using a GUI, CLI, API, etc.). Data set generator 231 may also generate training data sets for training machine learning models. Training data sets may comprise curated data with annotated training features in labels for supervised learning. Training data sets may comprise other structure as necessary for semi-supervised, self-supervised, and unsupervised learning. In at least one embodiment, data set generator 231 may utilize data sources identified in the information received via upload server 225 or data from the data sources that was uploaded to upload server 225. In at least one embodiment, data set generator 231 may utilize data stored in data store 210.

Server 240 includes rule generation engine 241 that is capable of generating intrusive activity detection rules 270 from one or more rule generation policies and one or more data sets. Rule generation processes are further described with respect to FIGS. 3 and 5A-D. Rule generation may be automatic or may involve interaction with users, e.g., via user devices 202A-N (e.g., using a GUI, CLI, API, etc.). In at least one embodiment, rule generation engine 241 may utilize data sets and/or rule generation policies received via upload server 225. In at least one embodiment, rule generation engine 241 may utilize data sets and/or rule generation policies stored in data store 210. In at least one embodiment, rules 270 may be stored in data store 210.

Server 260 includes training engine 261 that is capable of training a machine learning model such as model 280. Model 280 may refer to the model artifact that is created by training engine 261 using training data sets including, for example, features and labels from data set generator 231. Training engine 261 may find patterns in the training data that map, for example, the training features to the target labels and may provide a machine learning model (model 280) that captures these patterns. The machine learning model may be composed of, e.g., a single level of linear or non-linear operations (e.g., a support vector machine (SVM) or may be a deep network, i.e., a machine learning model that is composed of multiple levels of non-linear operations. An example of a deep network is a neural network with one or more hidden layers, and such machine learning model may be trained by, for example, adjusting weights of a neural network in accordance with a backpropagation learning algorithm or the like. In some embodiments, model 280 may be part of an intrusive activity detection rule (e.g., a rule of rules 270). For example, a machine learning model comprising a single level of linear or non-linear operations may be re-expressed using the native operations (e.g., addition, multiplication) of the detection rule format (e.g., YARA-L or similar).

Server 250 includes rule evaluation engine 151 that is capable of applying intrusive activity detection rules to live data and issuing alerts when intrusive activity is detected. Rule evaluation engine 151 may be part of a deployment or production environment of the security platform. In at least one embodiment, the live data may be uploaded from computing resources (e.g., computing resources 104A-C of FIG. 1) via upload server 225. In at least one embodiment, rule evaluation engine 151 may include inference engine 152 that is capable of performing inference on one or more machine learning models using the live data. Inference engine 152 may utilize machine learning domain-specific tooling or frameworks for optimized inferencing. In at least one embodiment, inference may be performed by rule evaluation engine 151 in the native rule format for machine learning models of intrusive activity detection rules as previously described. Thus, a dedicated inferencing engine such as inference engine 152 may not be necessary in these embodiments.

In general, functions described in one embodiment as being performed by the security platform or servers 220, 230, 240, 250, or 260 can also be performed external to the security platform. For example, data set generation or rule generation may be performed at user devices 202A-N or at a third-party platform. In addition, the functionality attributed to a particular component can be performed by a different or multiple components operating together. The components of servers 220, 230, 240, 250, or 260 can also be accessed as a service provided to other systems or devices through appropriate APIs. These service components and APIs may be provided by or accessed by different entities. In some embodiments, functions described in one embodiment as being performed by the security platform or servers 220, 230, 240, 250, or 260 can also be performed by independent systems or services. Such systems and services may, for example, provide APIs to interoperate with one or more external security platforms (e.g., SIEM platforms), thereby providing the functions described herein for the external security platforms.

Figure 3A:
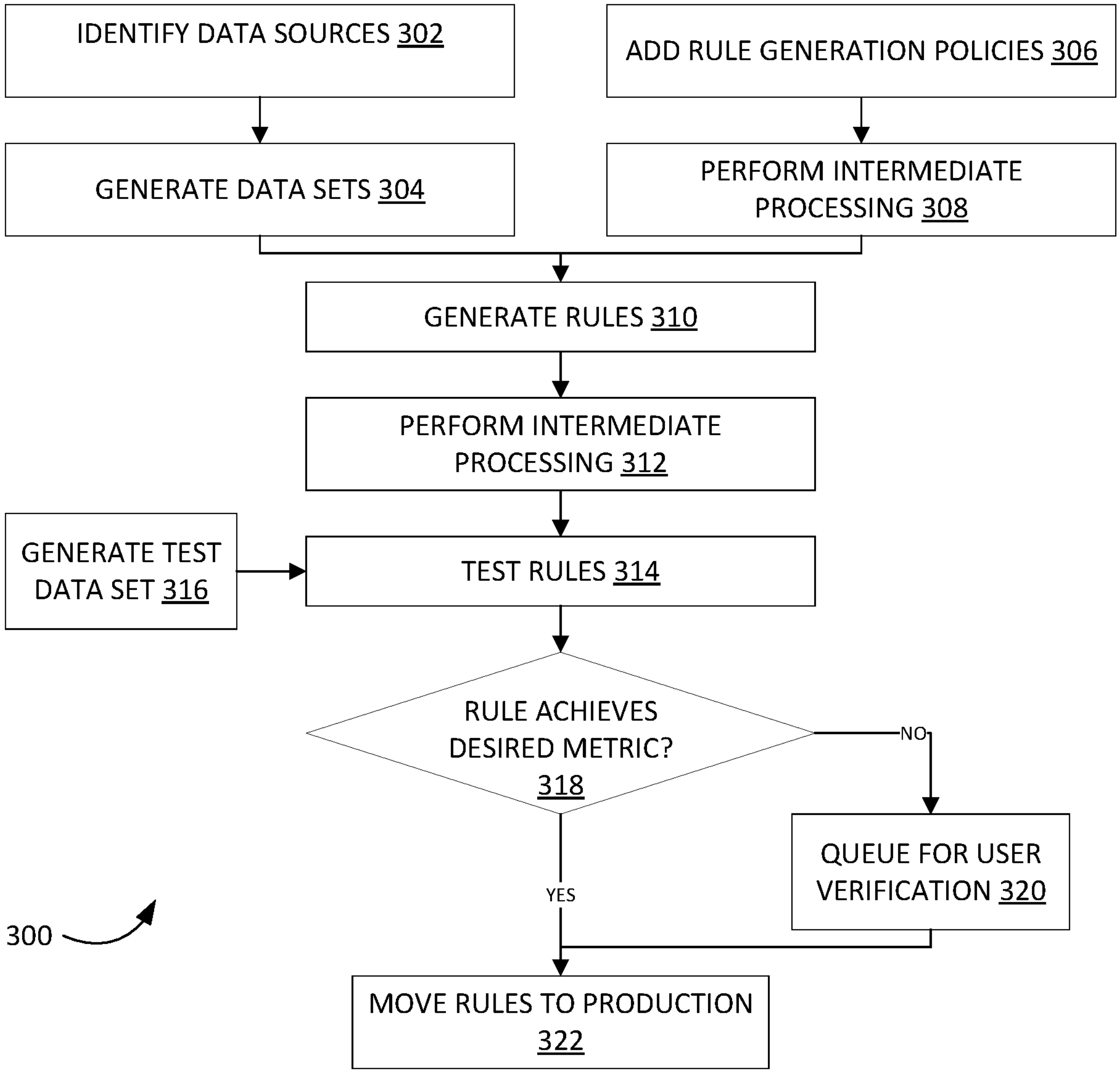
FIGS. 3A-B depict example flow diagrams illustrating automatic rule generation and data-driven detection engineering at a security platform in accordance with at least one embodiment.
Figure 3B:
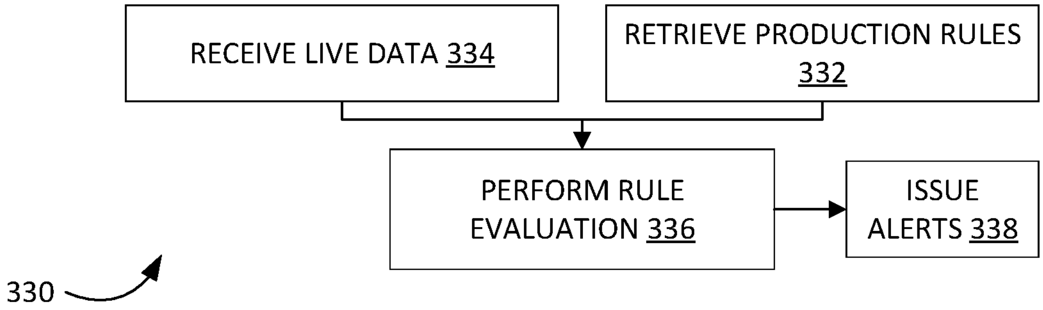

FIGS. 3A-B illustrate flow diagrams for example methods 300 and 330 to facilitate automatic rule generation and data-driven detection engineering at a security platform in accordance with at least one embodiment. Methods 300 and 300 may be performed by processing logic that may include hardware (circuitry, dedicated logic, etc.), software (e.g., instructions run on a processing device), or a combination thereof. In some embodiments, some or all operations of methods 300 or 330 may be included in security platforms 102A-C of FIG. 1 and/or security platform architecture 200 of FIG. 2. In some embodiments, one or more blocks of methods 300 or 330 may be external to the security platform. Examples of hardware and software components that may be used to implement methods 300 or 330 are described with respect to FIGS. 1, 2, and 7. In some embodiments, one or more of the depicted blocks of methods 300 or 330 may be presented in a different order or omitted. In some embodiments, additional blocks not depicted in FIGS. 3A and 3B may be present (e.g., additional intermediate processing blocks). Additional example methods pertaining to automatic rule generation are described with respect to FIG. 6.

Referring to FIG. 3A, at block 302 processing logic identifies data sources that may be made available to the security platform for automatic rule generation. One or more of the example data sources described with respect to block 302 may not be used in some security platforms, and some security platforms may use other data sources not described with respect to block 302 or described herein. In some embodiments, data sources may be external to the security platform. For example, client logs, client files, and third-party threat feeds may be imported into the security platform. In some embodiments, data sources may be internal to the security platform. For example, the security platform may include a sandbox environment for evaluating new threats (e.g., new malware), and the data captured from the sandbox environment may be used within the security platform.

Logs, journals, and other types of logging activity may be data sources for the security platform. For example, network traffic logs or process logs of computing resources may be imported into the security platform from a client entity or a third-party entity. Logs may also originate from sources internal to the security platform, such as sandbox environments. Logs may be unmodified or may be curated (e.g., modified, filtered) prior to import. Logs may include various fields useful for detecting intrusive activity, such as timestamps, process IDs, command line arguments, IP addresses and port numbers, etc. Similarly, libraries, repositories, and file systems that store files, email attachments, disk images, binary blobs, and other file-like data may be data sources for the security platform. Such data sources may include external sources and/or internal sources such as sandbox environments.

Data stores including threat feeds may be data sources for the security platform. Threat feeds may originate internal or external to the security platform and may provide intelligence on recent or relevant security threats. For example, threat feeds may include patterns or indicators (e.g., such as in logs or files) of intrusive activity related to recent cyberattacks, academic or commercial research, known vulnerabilities, etc.

Data stores at external security platforms may be data sources for the security platform. For example, intrusive activity detection rules from an external security platform may be imported into the security platform. These intrusive activity detection rules may use a different format or representation than the security platform uses for its internal detection rules, or they may use the same format or representation. Example formats include YARA, YARA-L, Splunk SPL, Sigma, and Snort. External security platforms may also include various data sources (e.g., logs and/or file repositories) coupled with detection annotations from the external security platform. Such data can thus represent the evaluations of the external security platform's detection rules for a limited set of data without access to the rules themselves.

At block 304, processing logic generates one or more data sets from the data sources identified at block 302. Data sets may be generated automatically, by users (e.g., security researchers), or by a combination of automation and user input. In some embodiments, data set generation may occur external to the security platform and the generated data sets may be imported into the security platform. Data sets may vary in content and scope. For example, a data set may focus on characterizing a particular malware target or malware family and may include a variety of logs, files, threat feeds, etc. relevant to characterizing the target. As a contrasting example, a data set may focus on characterizing any intrusive activity that can be detected using only network traffic logs. Data sets may include additional information added automatically or by users, such as metadata or classification labels. Data sets may include other data sets and may be subsets or supersets of other data sets. Data sets may be modified or updated over time, e.g., to add new relevant data or remove stale data. In some embodiments, data set modifications may trigger automatic rule generation to update subsequent blocks of flow diagram 300. Example data sets are described with respect to FIG. 4A-E.

At block 306, processing logic adds one or more rule generations policies to a data store of the security platform. Rule generation policies may be added by users such as security researchers. Rule generation policies may describe transformations of one or more data sets into one or more rules. In some embodiments, rule generation policies may include templates that map data sets to rules. For example, a rule generation policy may map each data point in a data set to a separate rule. In some embodiments, rule generation policies may include software programs that ingest data sets and generate rules according to an internal procedure, such as an algorithm or heuristic. For example, a rule generation policy may include a procedure to identify training features and labels from the input data set(s) and train a binary classifier rule to identify intrusive activity. In some embodiments, rule generation policies may include other descriptive patterns (e.g., regular expressions), imperative procedures, combinations of the above, or other techniques for transforming data sets to rules. As an additional example, a rule generation policy may translate a data set of detection rules expressed in one format (e.g., from an external security platform) to the rule format used internally by the security platform. Rule generation policies may be modified or updated over time, e.g., to add new rule generation techniques. In some embodiments, rule generation policy modifications may trigger automatic rule generation to update subsequent blocks of flow diagram 300. Example rule generation policies are described with respect to FIG. 5A-D.

At block 308, processing logic performs intermediate processing on the rule generation policies. Intermediate processing may involve a variety of automatic or user-driven modifications to the rule generation policies and may vary between different embodiments. Some embodiments may not have an intermediate processing block. An example of intermediate processing may be a preprocessing stage that expands one or more macros in the rule generation policies. Another example of intermediate processing may be a compiling stage that converts varied rule generation policies into a common intermediate representation. A compiling stage may be useful if a security platform supports rule generation policies expressed in multiple programming languages. For example, a data scientist may prefer to express ML-based rule generation policies in one language (e.g., Python), while a security researcher may prefer to express rule generation policies in a different language (e.g., Go). Another example of intermediate processing may be an optimization stage that optimizes individual rule generation policies for efficiency (e.g., computational or memory efficiency) or combines multiple rule generation policies in a single more efficient rule generation policy.

At block 310, processing logic applies the rule generation policies from blocks 306 and/or 308 to the data sets from block 304 to generate one or more intrusive activity detection rules. Rule generation may be performed by a rule generation engine. The rule generation engine may ingest the transformation(s) described by the rule generation policies and apply the transformations to the data sets to generate the detection rules. Rule generation may also be performed by the rule generation policies themselves, e.g., for rule generation policies expressed as software programs. The rule generation engine may provide supporting infrastructure such as an interpreter or runtime environment for the rule generation policies in this example. In some embodiments, as described with respect to previous blocks, any changes to the data sets or rule generation policies in the previous blocks may trigger the security platform to automatically run rule generation at block 310 again (as well as subsequent blocks) to update the generated rules. Thus, users are not burdened with manually updating and managing rules whenever new data or rule generation policies are introduced at the security platform. In some embodiments, generated rules may be associated with or linked to the respective data sets and/or rule generation policies from which they were derived. For example, a hash of a generated rule may be stored with a data set or rule generation policy or vice versa. Links and associations may aid the security platform in automatic regeneration of rules as well as support efficient management of related data sets, rule generation policies, and generated rules by users.

At block 312, processing logic performs intermediate processing on the generated detection rules. Intermediate processing may involve a variety of automatic or user-driven modifications to the generated detection rules and may vary between different embodiments. Some embodiments may not have an intermediate processing block. In some embodiments, the example intermediate processing stages described herein may be performed by the rule generation engine at block 310. An example of intermediate processing may be an optimization stage that optimizes the generated detection rules for efficiency and removes or combines duplicate or overlapping detection rules. Duplicate or overlapping detection rules may occur, for example, when separate rule generation policies operate on the same data sets or have some other overlap in threat coverage. By automatically pruning duplicative rules, the security platform can operate more efficiently in the production environment (described with respect to flow diagram 330 below) and users are not burdened with manually managing potentially large sets of automatically generated detection rules.

At block 314, processing logic initiates testing of the automatically generated detection rules against a test data set generated at block 316 and evaluated using one or more metrics. The test data set may be derived from the generated data sets at block 304 or may originate from another source. For example, the test data set may be derived from live data. The test data set may include data used during rule generation at block 310 or may include previously unseen data. The test data set may include features (e.g., excerpts of logs, files, etc.) coupled with labels indicating whether intrusive activity is present in the features and hence whether the detection rules under test should trigger an alert. In some embodiments, the metrics may be based on the number of true positive, true negative, false positive, and false negative classifications. Example metrics include false positive rate, precision, recall, F-score, and accuracy. In some embodiments, the metrics may be based on resource use, such as evaluation time or memory usage. Other metrics may be relevant in some embodiments.

At block 318, processing logic compares the evaluated metrics to one or more threshold criteria. For example, a rule's precision score may be required to meet or exceed a threshold percentage. Threshold criteria may be the same for all rules under test or may vary. For example, threshold criteria may be different for each data set or rule generation policy. If a rule under test meets the threshold criteria, the rule may be automatically placed in a production rule set. If the rule under test does not meet the threshold criteria, it may be queued for user verification (e.g., by security researchers) at block 320. The user may analyze the test results and/or the rule and may modify the rule in various embodiments. After verification, the user may decide to place the rule or modified rule in a production rule set or discard the rule. In some embodiments, a rule may be automatically discarded instead of queued for user verification at block 320. In some embodiments, one or more rules may not be tested. In some embodiments, blocks 314-320 may not be present, and all automatically generated rules are placed in a production rule set.

In some embodiments, rule testing may comprise a plurality of stages of progressive testing. For example, at block 314, three stages of testing may be used: small (e.g., the test data set may comprise one day's worth of live data from 10 clients), medium (e.g., three days, 300 clients), and large (e.g., three days, 30,000 clients). After running the small stage test at block 314, a rule may be evaluated at block 318 as previously described (e.g., using a false positive rate metric). If the rule passes, it will return to block 314 for the medium stage test and so on. If the rule passes all stages, it may be placed in a production rule set. If the rule fails at any stage, it may be queued for user verification at block 320 as previously described.

In some embodiments, rules queued for user verification at block 320 may be ordered based on priority for review. Rules may be prioritized in various ways. For example, rules with a higher metric score, although insufficient to pass block 318, may be prioritized higher because they may be more likely to be approved by a user with few or no modifications. Rules with a lower metric score may be fundamentally flawed or may need significant modifications, and thus may have a lower priority score. As an additional example, rules may be prioritized based on the number of testing stages they pass in a multi-stage testing embodiment. A rule that failed after the large stage may be given higher review priority than a rule that failed after the small stage because it may be more likely to be approved by a user with few or no modifications based on its previous testing successes. In some embodiments, rules with a sufficiently low priority or rules that have been in the queue for a length of time (e.g., a certain number of days) may be automatically discarded. Thus, the user verification queue can adapt to the rate of influx of new rules and the availability of users for review and verification.

At block 322, processing logic rules that have passed testing and/or user verification (if such blocks are present) are moved to production, where they may be used to detect future intrusive activity as described with respect to FIG. 3B.

Referring to FIG. 3B, example method 330 is directed to rule evaluation in a production environment. In particular, at block 332 processing logic retrieves production rules that may include automatically generated rules that have passed the automatic testing stage and/or user verification. Production rules may be retrieved, e.g., from data store 210 of FIG. 2. In some embodiments, production rules retrieved at block 332 may also include rules such as legacy rules or user-generated rules that were not generated by the automatic rule-generation process. As described with respect to previous blocks, the security platform may regenerate the automatically generated detection rules in some circumstances. Upon regenerating and testing the updated detection rules, some or all of production rules retrieved at block 332 may be updated, replaced, or removed as necessary. At block 334 processing logic receives live data that may include streams of data (e.g., logs, files) from computing resources. As described with respect to FIG. 1C, the production environment may serve computing resources associated with a single entity or with multiple entities. In the former case, live data received at block 334 may originate with computing resources of a single entity. In the latter case, live data may comprise a mix of data associated with computing resources of each entity. At block 336, processing logic evaluates (e.g., using a rule evaluation engine) the production rules on live data. For example, the rule evaluation engine may evaluate rules in the YARA format. Upon detecting intrusive activity in live data matching one of the production rules, processing logic (e.g., using the rule evaluation engine) may issue one or more alerts at block 338. Alerts may be issued to users (e.g., security researchers), computing resources, entities associated with the computing resources, and/or other relevant parties. Alerts may be issued via GUI, CLI, API, email, or other synchronous or asynchronous messaging channels.

FIGS. 4A-E illustrate example data sets 400, 410, 420, 430, and 440, in accordance with at least one embodiment. In at least one embodiment, data sets 400, 410, 420, 430, and/or 440 may be data sets generated at block 304 of FIG. 3A. More generally, data sets 400, 410, 420, 430, and/or 440 may be received at a security platform, either from an internal source such as a data set generator (e.g., data set generator 231 of FIG. 2) or from an external source such as a user, external data set generator, or external data source. As described with respect to FIG. 3A, data sets may be automatically derived from data sources, created by users, or created with a combination of these methods. In some embodiments, data sets may be raw data, e.g., data copied unmodified from a data source without annotations. Data sets may include full copies of data points, pointers to data points (e.g., pointers to a data source), or a combination of both. In some embodiments, data sets may be automatically updated by the security platform in response to various events. For example, data sets may be regenerated when the underlying data sources change. If a data set is constructed from a SQL query on the underlying data source, then the security platform may automatically run the SQL query again to update the data set when the data source changes. As an additional example, data sets may be regenerated when an internal data set format of the security platform changes (e.g., new fields are supported, and the relevant data should be queried from the data source). In some embodiments, data sets may be created and updated by machine learning and data science users using domain-specific tools (which may or may not be integrated into the security platform). In some embodiments, data sets may include continuously ingested and processed data (e.g., streamed data) that is matched as part of an ingestion pipeline Some automated aspects of data set generation may overlap with or may instead be implemented in the rule generation stage.

Figure 4A:
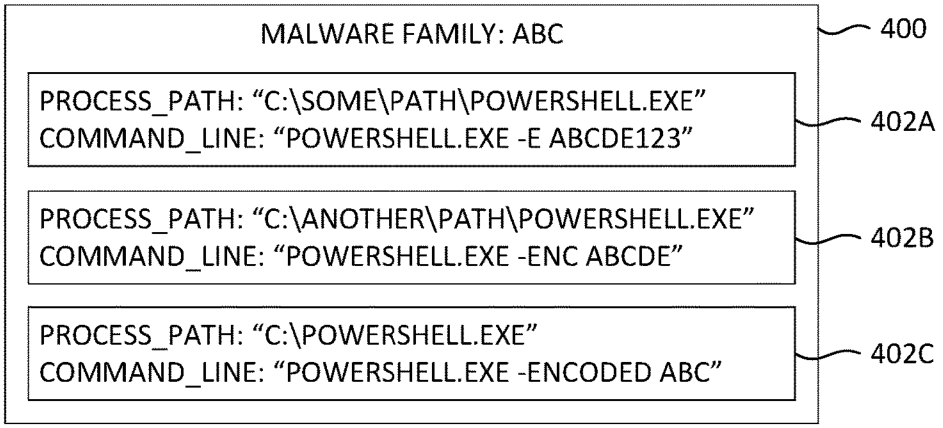
FIGS. 4A-E illustrate example data sets in accordance with at least one embodiment.

Referring to FIG. 4A, data set 400 includes example data points 402A-C related to a single malware instance or malware family. Each data point may include process information related to one or more versions of malware running in one or more environments, such as the process or executable path and the command line arguments. Other process information such as process ID, user ID, group ID, timestamp, subprocesses, resource usage (e.g., CPU, memory, I/O), strings and streams (e.g., STDIN, STDOUT, STDERR), etc. may be included in some embodiments. Data points 402A-C may be derived from data sources (e.g., using SQL queries or regular expressions) such as process log data received from a client entity or an internal sandbox environment. Data points 402A-C may also be selected by users analyzing the data sources. While FIG. 4A depicts a data set encompassing a single malware family, other levels of granularity are possible. For example, a single data set may encompass all malware detectable from process information signatures for a single client entity or for a specific period of time. As a contrasting example, a single data set may encompass only a specific version of malware running on a specific version of a specific operating system. In some embodiments, data sets within a security platform may have a variety of granularities and may include overlapping data and/or threat coverage.

Figure 4B:
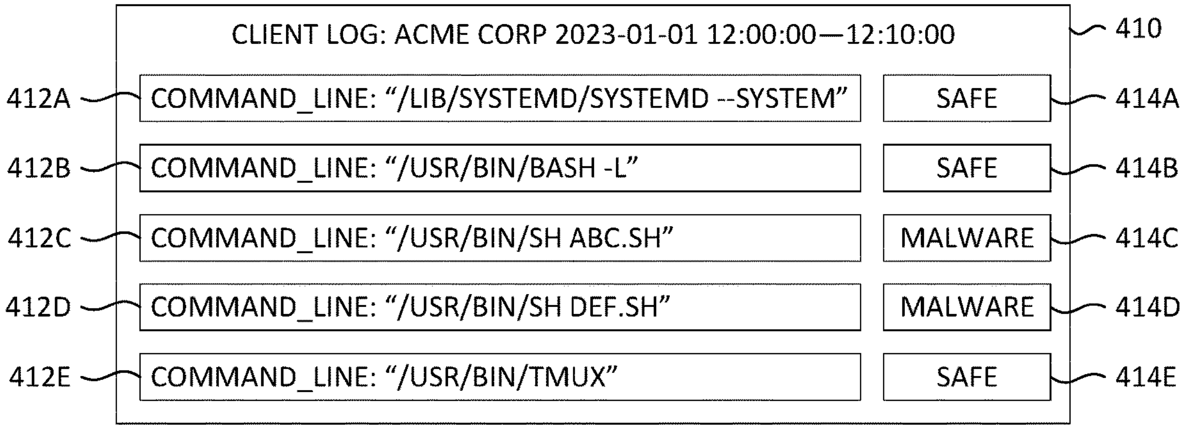

Referring to FIG. 4B, data set 410 includes example data points from a specified client log comprising command line arguments 412A-E and labels 414A-E for a specified period of time. In contrast to data set 400, data set 410 includes both intrusive activity-related and normal activity-related data points. In some embodiments, mixed data points may provide additional information related to how the intrusive activity (e.g., malware) interacts with normal system processes. Labels 414A-E indicate whether a data point is associated with intrusive activity or normal activity and may be automatically generated or generated by a user. In some embodiments, labels may be more granular. For example, an otherwise-normal process may be labeled as malware-adjacent because it was spawned as a subprocess of a malware process. As described with respect to FIG. 5B, command line arguments 412A-E and labels 414A-E may be training features and labels, respectively, for a rule generator implementing a machine learning model training process.

Figure 4C:
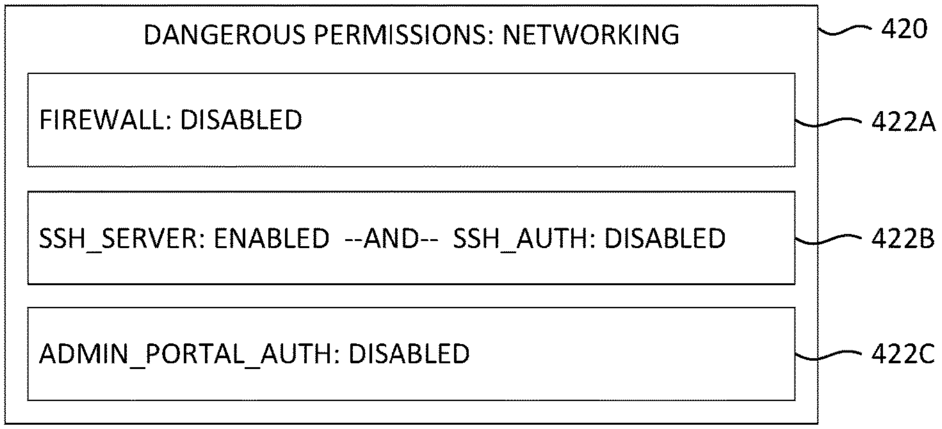

Referring to FIG. 4C, data set 420 includes example data points 422A-C related to system permissions and configurations that may introduce dangerous vulnerabilities or potentially lead to system compromise. Such permissions and configurations may be introduced unintentionally or maliciously. Data set 420 and similar data sets may be created as user-generated templates by users using known best practices or after analyzing interactions between different configuration settings and previous intrusive activity. Data set 420 and similar data sets may also be created automatically, e.g., by identifying common configurations across previously compromised systems. Similar data sets may also encompass interactions between different configurations, e.g., expressed using Boolean operators or other operators. For example, data point 422B illustrates a compound configuration that might be dangerous if a network-facing service is enabled while authentication is simultaneously disabled for that service. Example data set 420 focuses on networking configuration, but other data sets may focus on other subsystems such as user and administrator permissions, password policies, allowed kernel modules, allowed applications, application settings, etc. As described with respect to other data sets, data sets related to system permissions and configurations may have varied granularity. For example, a single data set may encompass permissions related only to a specific subsystem as depicted in FIG. 4C, or a single data set may encompass all permissions for a specific version of a specific operating system. In some embodiments, data sets may include Identity and Access Management (IAM) permissions and configurations for cloud platforms and other systems. For example, a data set of IAM permissions may indicate dangerous configurations that may result from misconfiguration by a user. In another example, a data set of IAM permissions may indicate malicious configurations associated with intrusive activity, such as a service account creating a new service account with excessive permissions.

Figure 4D:
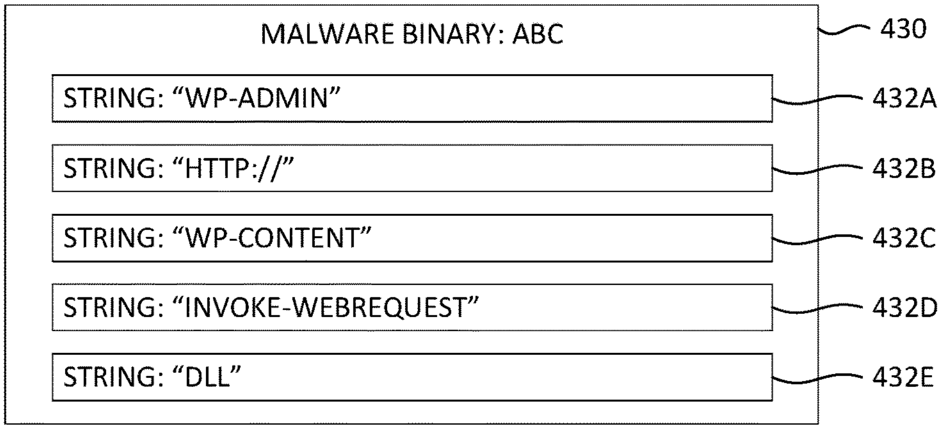

Referring to FIG. 4D, data set 430 includes example data points 432A-E related to a single malware binary or family of malware binaries. Each data point may include strings that may be found in the related malware binary, such as in a string table (e.g., the .STRTAB section of an ELF file) or in any text of a script file. Data points may include other components of a malware binary, such as sequences of opcodes or other data. In some embodiments, data points may encompass input and/or output of a malware binary, such as STDIN, STDOUT, and STDERR. As described with respect to other data sets, data sets related to binaries, scripts, and other executables may have varied granularity, potentially covering various versions and types of malware across various operating systems and platforms.

Figure 4E:
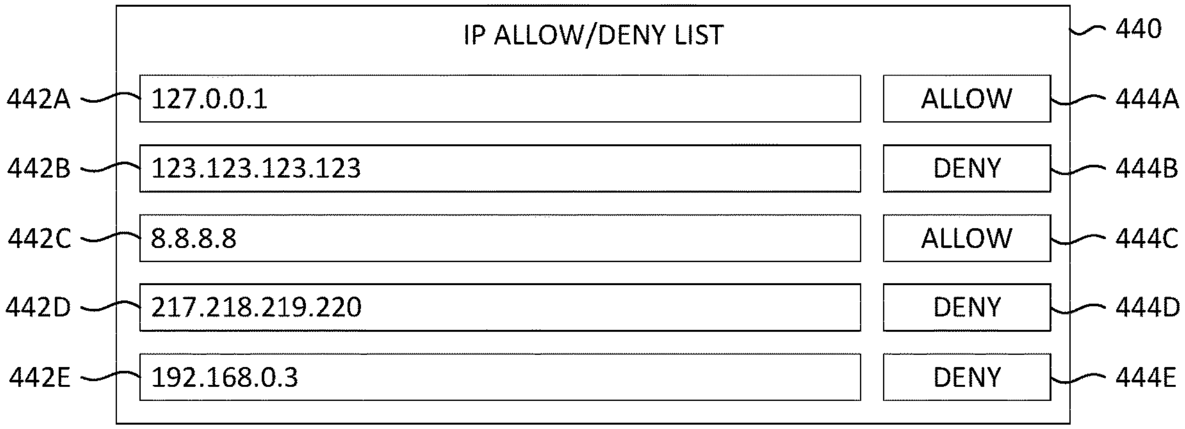

Referring to FIG. 4E, data set 440 includes example data points from an IP allow/deny list comprising IPs 442A-E and labels 444A-E. For example, some IPs may correspond to legitimate services such as DNS (and should be allowed), while other IPs may correspond to intrusive services or users such as a malware command and control server (and should be denied). In some embodiments, IPs 442A-E and/or labels 444A-E may include more granular information such port numbers, interfaces, and whether the IP is a source or destination address. More generally, any firewall configuration or subset of a firewall configuration may be converted to a data set (e.g., automatically or by a user). Data sets may include analogous allow/deny lists related to kernel modules, devices, applications, etc. in some embodiments.

While FIGS. 4A-E depict a variety of possible data sets and formats that may be used in a security platform for automatic rule generation and data-driven detection engineering, many others are possible. In some embodiments, features of example data sets 400, 410, 420, 430, and 440 may be combined, with or without other features not depicted, to create other types of data sets. As previously described, data sets of varying granularities may coexist in a security platform and may be useful for different purposes and different rule generation policies. Data sets may have overlapping data points or threat coverage with other data sets, and some data sets may even be composites of other data sets. In some embodiments, data sets may be versioned (e.g., using a version control system such as Git, DVC, Mercurial, Subversion, etc.), and different versions of data sets may coexist in a security platform. In some embodiments, incrementing a data set version may initiate automatic regeneration of rules as described with respect to FIG. 3A and elsewhere herein.

FIGS. 5A-D illustrate automatic rule generation with example rule generation policies 500, 510, 520, and 530, in accordance with at least one embodiment. In at least one embodiment, rule generation policies 500, 510, 520, and/or 530 may be rule generation policies received at block 306 of FIG. 3A, and automatic rule generation may occur at block 310. As described with respect to FIG. 3A, rule generation policies may be software programs, regular expressions and other template-based descriptors, or any other form of policy for transforming one or more data sets into one or more rules. In some embodiments, a rule generation engine may perform rule generation according to the transformation described in the rule generation policies. Generated rules may be in one or more rule formats (e.g., YARA-L) corresponding to one or more rule evaluation engines supported by the security platform. In some embodiments, rules may be automatically updated by the security platform in response to various events. For example, rules may be regenerated when the underlying data sets and/or rule generation policies change. As an additional example, rules may be regenerated when an internal rule format, data set format, or rule generation policy format of the security platform changes, or when new optimizations are introduced that may improve efficiency of generated rules. In some embodiments, rule generation policies may be created and updated by machine learning and data science users using domain-specific tools (which may or may not be integrated into the security platform). As described with respect to FIGS. 4A-E, some automated aspects of rule generation may overlap with or may instead be implemented in the data set generation stage.

Figure 5A:
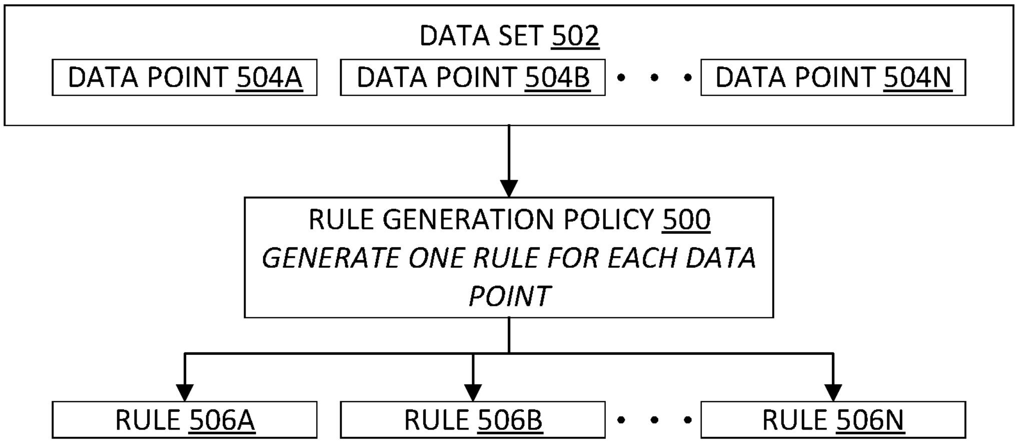
FIGS. 5A-D illustrate automatic rule generation with example rule generation policies in accordance with at least one embodiment.

Referring to FIG. 5A, rule generation policy 500 may define a one-to-one mapping between data points 504A-N of data set 502 and rules 506A-N. For example, rule generation policy 500 may pertain to a data set similar to data set 400 of FIG. 4A, where each data point corresponds to a single observation of a type of intrusive activity. Rule generation policy 500 may create a rule for each observation that triggers an alert when the corresponding event is observed in future activity (e.g., future client logs). As an additional example, rule generation policy 500 may pertain to a data set of detection rules in a different format imported from an external security platform. Rule generation policy 500 may include logic to translate (e.g., a cross-compiler or similar) each rule in the external format to a corresponding rule in the internal format. In some embodiments, generated rules 506A-N may have overlapping coverage and thus may trigger on the same events.

Figure 5B:
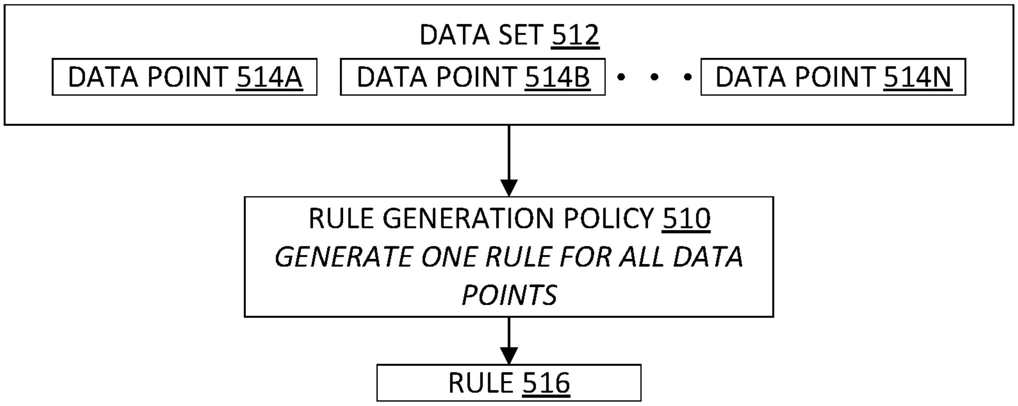

Referring to FIG. 5B, rule generation policy 510 may define a many-to-one mapping between data points 514A-N of data set 512 and rule 516. For example, rule generation policy 510 may pertain to a data set similar to data set 400 of FIG. 4A, as previously described. Rule generation policy 510 may include logic for combining all observations from data points 514A-N into a single rule that triggers an alert when any of the corresponding events are observed in future activity. In some embodiments, the combination logic may be Boolean logic, such as a chain of logical ORs for all of the observations associated with data points 514A-N. In some embodiments, the combination logic may include additional features and optimizations, such as eliminating duplicative observations or generating regular expressions to represent multiple observations. As an additional example, rule generation policy 510 may pertain to a data set similar to data set 430 of FIG. 4D to generate a single rule that triggers an alert when a binary includes all of (or a subset of) string data points 432A-E. In some embodiments, data points 514A-N may be combined into a single rule using algorithms or heuristics. In general, rule generation policies such as rule generation policy 500 and rule generation policy 510 may provide many-to-one, one-to-many, and many-to-many (including more and fewer) mappings between data points and generated rules.

Figure 5C:
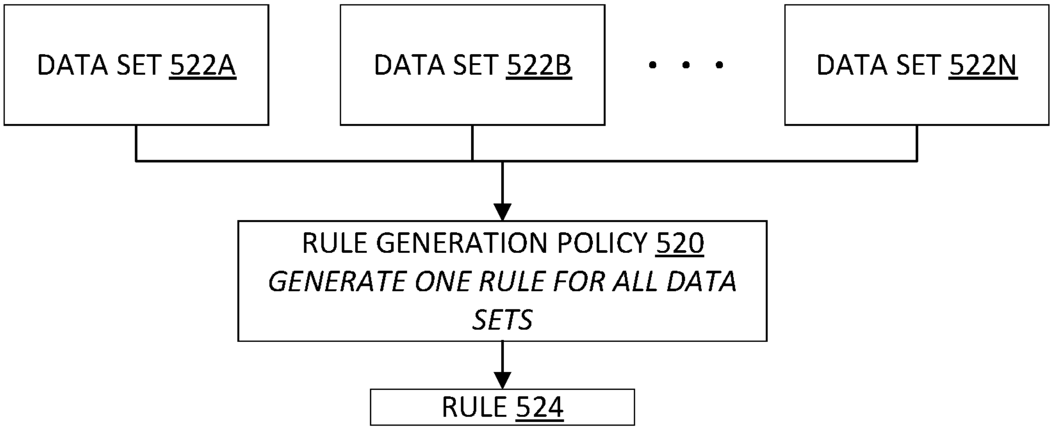

Referring to FIG. 5C, rule generation policy 520 may define a mapping between multiple data sets 522A-N and rule 524. For example, rule generation policy 520 may pertain to multiple data sets 400 of FIG. 4A (e.g., from different client entities or sandbox environments) to generate a single rule using appropriate combination logic. In some embodiments, data sets 522A-N may be different types of data sets. For example, rule generation policy 520 may pertain to data sets 400 of FIG. 4A in combination with data set 420 of FIG. 4C to create more complex behaviors in generated rules that are responsive to observed events in the context of specific system configurations. In this example, some observed events may be harmless if the system is properly configured but may indicate intrusive activity if the system is misconfigured. As an additional example, rule generation policy 520 may pertain to data sets 400 of FIG. 4A in combination with data set 440 of FIG. 4E to generate rules that are responsive to observed events in the context of network activity associated with those events. In some embodiments, multiple rules may be generated from multiple data sets.

Figure 5D:
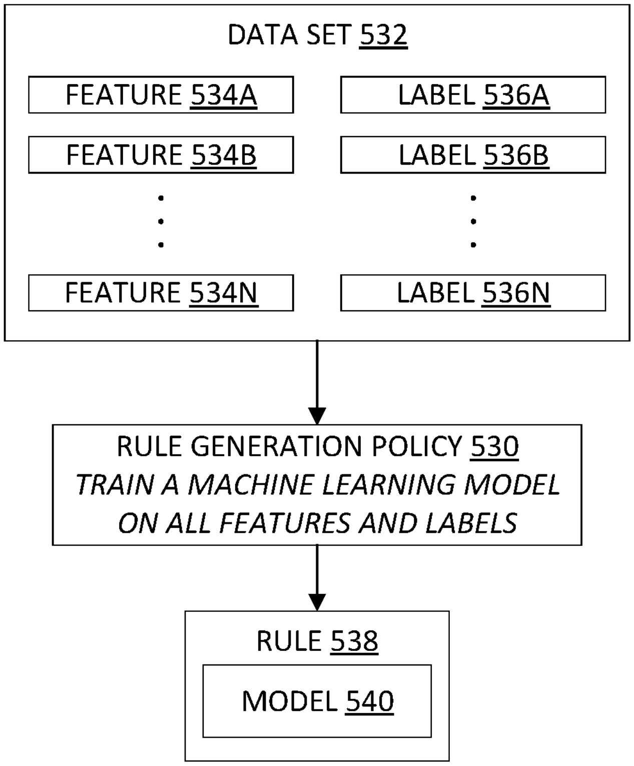

Referring to FIG. 5D, rule generation policy 530 may define a machine learning training process using training data from data set 532 (features 534A-N and labels 536A-N) to generate rule 538 with embedded machine learning model 540. For example, rule generation policy 530 may pertain to labeled data sets such as data set 410 of FIG. 4B or data set 440 of FIG. 4E to generate a binary classifier machine learning model that classifies future activity as intrusive or non-intrusive. Example binary classifiers that may be trained by rule generation policy 530 include naïve Bayes, logistic regression, support vector machines (SVMs), decision trees, and various forms of deep learning/neural networks (e.g., multi-layer perceptron (MLP), convolutional neural network (CNN), recurrent neural network (RNN), auto-encoder, transformer, etc.). Although described with respect to supervised learning on labeled training data, rule generation policies may use supervised, semi-supervised, self-supervised, or unsupervised training on labeled, unlabeled, or mixed training data in various embodiments. In some embodiments, machine learning models may be trained for outputs other than binary classification, such as multi-class classification, forecasting, generative outputs, etc. As described with respect to FIG. 2, some embodiments of security platforms may include an inferencing engine as part of or in addition to a rule evaluation engine to support performing inference on generated rules comprising machine learning models. In at least one embodiment, model 540 may be embedded in rule 538 using a machine learning native-format, and rule evaluation may be performed by the inferencing engine. In at least one embodiment, model 540 may embedded in rule 538 by converting the model to a detection rule format using native operations of the detection rule format (e.g., addition and multiplication of the learned model weights). As described elsewhere herein, aspects of the training and/or inferencing stages may be performed by machine learning domain-specific tooling, which may be external to the security platform in some embodiments.

Figure 6:
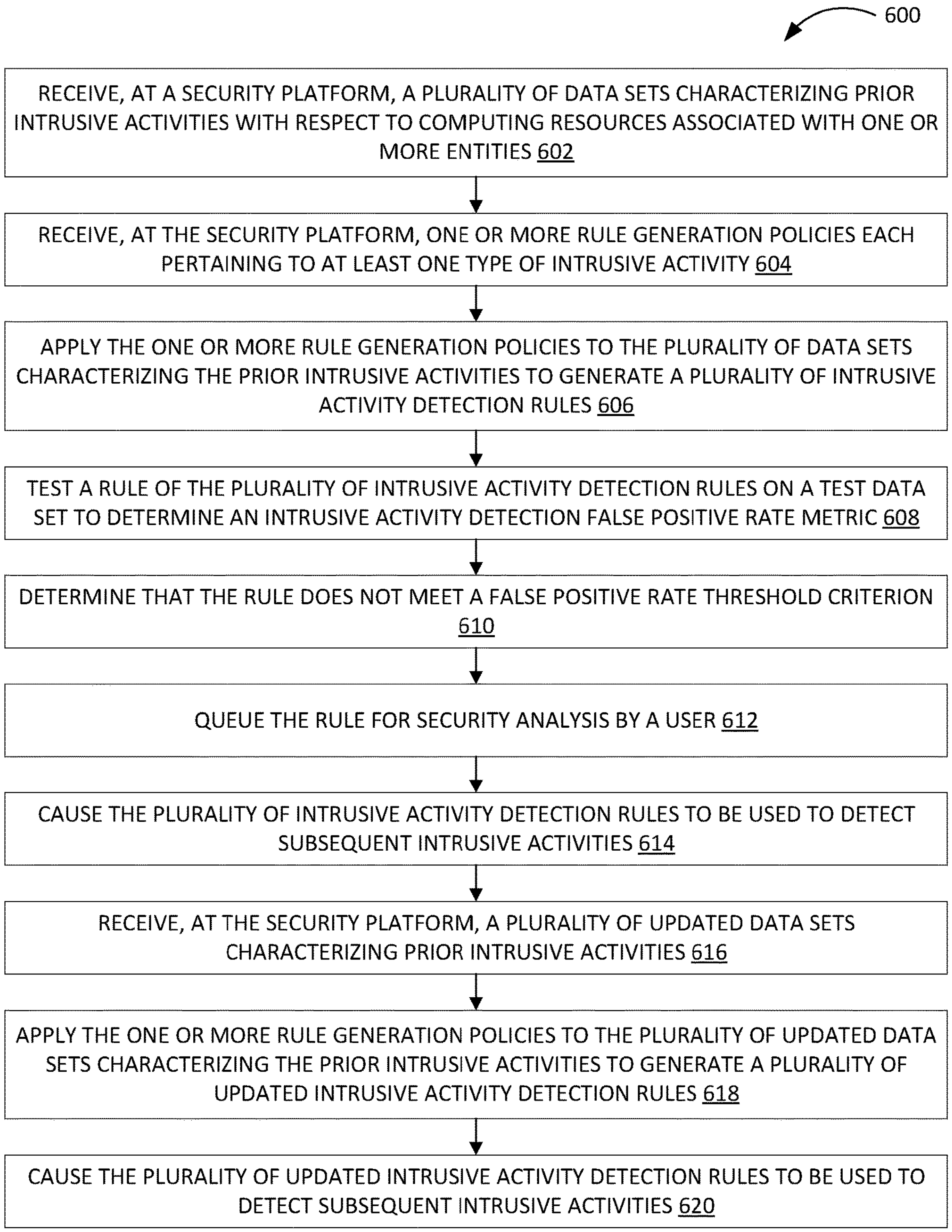
FIG. 6 depicts a flow diagram of an example method for providing automatic rule generation and data-driven detection engineering at a security platform, in accordance with at least one embodiment.

FIG. 6 is a flow diagram of an example method 600 for providing automatic rule generation and data-driven detection engineering at a security platform, according to at least one embodiment. Method 600 can be performed by processing logic that can include hardware (circuitry, dedicated logic, etc.), software (e.g., instructions run on a processing device), or a combination thereof. In at least one implementation, some or all of the operations of method 600 can be performed by one or more components of security platform architecture 200 of FIG. 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states e.g., via a state diagram. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 602, processing logic receives, at a security platform, a plurality of data sets characterizing prior intrusive activities with respect to computing resources associated with one or more entities. In at least one embodiment, the security platform may be one of security platforms 102A-C of FIG. 1 or security platform architecture 200 of FIG. 2. In at least one embodiment, the computing resources associated with one or more entities may be computing resources 104A-C of FIG. 1. The entities may be, for example, owners or operators of the computing resources, such as data center owners or cloud computing platform clients. Data sets may be received from a source internal to the security platform, such as a data set generator at block 304 of FIG. 3A, or from a source external to the security platform, such as from a user, an external security platform, or other external tools (e.g., machine learning tools). The data sets may include a variety of data characterizing prior intrusive activities, such as process or network logs (e.g., time series log data as in FIG. 4B), malware binaries or binary patterns (e.g., strings as in FIG. 4D), user-generated templates (e.g., permissions lists or configuration templates as in FIG. 4C), rules or annotated data from external security platforms, etc. The data sets may comprise raw data (e.g., copied unmodified from the data source), curated data (e.g., some data points added, removed, reordered, etc.), annotated data (e.g., labels added to data points), or a combination of the above. For example, time series log data may be annotated with labels indicating associated intrusive activity detections from an external intrusive activity detection tool. Additional examples of data sets are described with respect to FIGS. 4A-E.

At block 604, processing logic receives, at the security platform, one or more rule generation policies each pertaining to at least one type of intrusive activity. Rule generation policies may be received from sources internal to or external to the security platform. For example, a user may upload a user-generated rule generation policy to the security platform or may import a rule generation policy from an external security platform. A rule generation policy may describe a mapping or transformation of one or more data points or data sets to one or more rules. In some embodiments, each of the one or more rule generation policies may comprise an algorithm or heuristic relating the at least one type of intrusive activity to at least one type of intrusive activity detection rule. Rule generation policies may be software programs, templates, or other imperative or descriptive format. A rule generation policy may pertain to a type of intrusive activity characterized by data sets of block 602. In at least one embodiment, the security platform may perform optimizations or other intermediate processing on the rule generation policies. An example rule generation policy may define translation of a data set comprising a plurality of source rules in a first format to a plurality of intrusive activity detection rules in a second format. Additional examples of rule generation policies are described with respect to FIGS. 5A-D.

At block 606, processing logic applies the one or more rule generation policies to the plurality of data sets characterizing the prior intrusive activities to generate a plurality of intrusive activity detection rules. In at least one embodiment, a rule generation policy may be applied to the data sets by performing the operations of the rule generation policy (e.g., a software program). In at least one embodiment, a rule generation engine may apply the description or operations of the rule generation policy to the data sets to generate the-plurality of intrusive activity detection rules. The plurality of generated intrusive activity detection rules may be in one or more formats used by the security platform, such as YARA. In at least one embodiment, the security platform may perform optimizations or other intermediate processing on the generated rules.

At block 608, processing logic tests a rule of the plurality of intrusive activity detection rules on a test data set to determine an intrusive activity detection false positive rate metric. The test data set may include previously seen or unseen data and may be derived from the data sets of block 602 or the data sources used to generate the data sets. In at least one embodiment, the test data set may include previously unseen live data from the computing resources or from a sandbox environment. The intrusive activity detection rules may output an alert in response to data points of the test data set, which may be compared to annotations to determine whether the alert represents a true positive or a false positive. A metric such as the false positive rate or other statistical metric may be calculated from the test results. In some embodiments, other metrics not related to a rule's performance on a test data set may be used, such as computational or memory efficiency metrics, runtime, etc.

At block 610, processing logic determines that the rule does not meet a false positive rate threshold criterion. A false positive rate (or other metric) threshold criterion may be determined by a user or automatically by the security platform and may be static or may change over time. A rule may not meet a threshold criterion when the metric is too high or too low in various embodiments.

At block 612, processing logic queues the rule for security analysis by a user. In some embodiments, the queue may be a first-in first-out queue or may be prioritized. Rules may be prioritized by test performance, breadth of threat coverage, or other differentiators. The queue may be an unbounded queue or may be bounded in various ways. For example, the queue may be limited in length, with lower-priority rules discarded. In another example, the queue may discard unreviewed rules after a certain passage of time (e.g., a few days). The user may analyze a rule's test performance, coverage, content and structure, and other aspects. The user may modify the rule in some cases. The user may ultimately decide to move the rule to the next block or discard the rule.

In some embodiments, the testing phase (blocks 608-612) may be absent or may be skipped for some rules. In some embodiments, the testing phase may include multiple stages of testing. During a stage of testing, a rule may pass and move to the next stage or may fail to meet the threshold and be queued for user verification. Queue prioritization may be based on how many stages of testing a rule has passed before failure.

At block 614, processing logic causes the plurality of intrusive activity detection rules to be used to detect subsequent intrusive activities. In at least one embodiment, the plurality of intrusive activity detection rules may be placed in a deployment or production environment, which may include a rule evaluation engine. The rule evaluation engine may apply the rules to live data (e.g., unseen data from computing resources) to detect subsequent intrusive activities. Upon detection intrusive activity, the rule or rule evaluation engine may issue an alert to users, the computing resources, or the entities associated with the computing resources.

At block 616, processing logic receives, at the security platform, a plurality of updated data sets characterizing the prior intrusive activities. The updated data sets may include new or modified data, additional data sets, new versions of data sets or data set formats, or other updates. In at least one embodiment, the updated data sets may comprise user feedback regarding one or more alerts generated by the plurality of intrusive activity detection rules. User feedback may be, for example, user-added labels (e.g., labels 414A-E of FIG. 4B). In at least one embodiment, processing logic may alternatively receive one or more updated rule generation policies at block 616. The updated rule generation policies may include new or modified policies, new versions of rule generation policies or policy formats, or other updates.

At block 618, processing logic applies the one or more rule generation policies to the plurality of updated data sets characterizing the prior intrusive activities to generate a plurality of updated intrusive activity detection rules. In at least one embodiment, all rule generation policies are applied to the updated data sets to regenerate the full plurality of rules. In at least one embodiment, a subset of rule generation policies is applied to the updated data sets, and subset of detection rules is regenerated (e.g., only the rules that will change as a result of the updates to the data sets). In at least one embodiment, the security platform may perform optimizations or other intermediate processing on the regenerated rules and/or the non-regenerated rules.

At block 620, processing logic causes the plurality of updated intrusive activity detection rules to be used to detect subsequent intrusive activities. In at least one embodiment, the plurality of updated intrusive activity rules may replace some or all of the intrusive activity detection rules previously used to detect subsequent intrusive activities at block 614. In at least one embodiment, multiple versions of a rule may be used to detect subsequent intrusive activities (e.g., the original rule generated at block 606 and the corresponding updated rule generated at block 618).

In at least one embodiment, at least one of the plurality of intrusive activity detection rules may correspond to a machine learning model. At least one of the one or more rule generation policies may define a set of features and respective labels in the plurality of data sets characterizing prior intrusive activities that are to be used to train the machine learning model. Each of the respective labels may indicate presence or absence of intrusive activity in one or more corresponding features of the set of features (e.g., as depicted in FIG. 4B). At block 606, applying the one or more rule generation policies to the plurality of data sets characterizing prior intrusive activities may comprise training the machine learning model using training data comprising the set of features representing training inputs and the respective labels representing target outputs for the training inputs. In some embodiments, at block 614, causing the plurality of intrusive activity detection rules to be used to detect subsequent intrusive activities may comprise applying the trained machine learning model to a new data set characterizing a new activity and obtaining an output of the trained machine learning model. The output may indicate whether the new activity is intrusive (e.g., by providing a likelihood metric of activity intrusiveness).

FIG. 7 is a block diagram illustrating an exemplary computer system 700, in accordance with implementations of the present disclosure. The computer system 700 can correspond to security platforms 102A-C, computing resources 104A-C, server 108, cloud computing platform 110, and/or client configuration device 112, described with respect to FIG. 1. The computer system 700 can also correspond to user devices 202A-N and/or servers 220 through 260, described with respect to FIG. 2. Computer system 700 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for providing automatic rule generation and data-driven detection engineering systems) for performing the operations discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker). In some embodiments, computer system 700 may not include video display unit 710, input device 712, and/or cursor control device 714 (e.g., in a headless configuration).

The data storage device 718 can include a non-transitory machine-readable storage medium 724 (also computer-readable storage medium) on which is stored one or more sets of instructions 705 (e.g., for providing automatic rule generation and data-driven detection engineering systems) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for providing automatic rule generation and data-driven detection engineering systems. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

receiving, at a security platform, a plurality of data sets characterizing prior intrusive activities with respect to computing resources associated with one or more entities;

receiving, at the security platform, one or more rule generation policies each pertaining to one or more respective transformations of one or more data sets into one or more intrusive activity detection rules, wherein the one or more rule generation policies are associated with a plurality of transformation types supported by the security platform, and wherein at least one of the one or more rule generation policies defines a mapping that translates one or more of the one or more data sets in one or more first formats to one or more of the intrusive activity detection rules in one or more second formats supported by the security platform;

applying the one or more rule generation policies to the plurality of data sets characterizing the prior intrusive activities to generate a plurality of intrusive activity detection rules in the one or more second formats supported by the security platform; and causing the plurality of intrusive activity detection rules to be used to detect subsequent intrusive activities.

2. The method of claim 1, further comprising:

testing a rule of the plurality of intrusive activity detection rules on a test data set to determine an intrusive activity detection false positive rate metric;

determining that the rule does not meet a false positive rate threshold criterion; and queuing the rule for security analysis by a user.

3. The method of claim 1, further comprising:

receiving, at the security platform, a plurality of updated data sets characterizing the prior intrusive activities;

applying the one or more rule generation policies to the plurality of updated data sets characterizing the prior intrusive activities to generate a plurality of updated intrusive activity detection rules; and causing the plurality of updated intrusive activity detection rules to be used to detect subsequent intrusive activities.

4. The method of claim 3, wherein the plurality of updated data sets characterizing the prior intrusive activities comprise user feedback regarding one or more alerts generated by the plurality of intrusive activity detection rules.

5. The method of claim 1, wherein each of the plurality of data sets characterizing prior intrusive activities comprises at least one of: a set of time series log data associated with the prior intrusive activities, a malware binary pattern associated with the prior intrusive activities, or a user-generated template representing the prior intrusive activities.

6. The method of claim 1, wherein each of the plurality of data sets characterizing prior intrusive activities comprises a set of time series log data coupled with associated intrusive activity detections from an external intrusive activity detection tool.

7. The method of claim 1, wherein each of the one or more data sets comprises a plurality of source rules in the one or more second first formats, and wherein mapping translates the plurality of source rules in the one or more first formats to the one or more intrusive activity detection rules in the one or more second formats.

8. The method of claim 1, wherein the plurality of transformation types include at least two of:

a template that maps data sets to intrusive activity detection rules;

an algorithm that ingests data sets to generate rules; or an algorithm that translates source rules to intrusive activity detection rules.

9. The method of claim 1, wherein:

at least one of the plurality of intrusive activity detection rules corresponds to a machine learning model;

at least one of the one or more rule generation policies defines a set of features and respective labels in the plurality of data sets characterizing prior intrusive activities that are to be used to train the machine learning model, wherein each label of the respective labels indicates presence or absence of intrusive activity in one or more corresponding features of the set of features; and applying the one or more rule generation policies to the plurality of data sets characterizing prior intrusive activities comprises training the machine learning model using training data comprising:

the set of features representing training inputs; and the respective labels representing target outputs for the training inputs.

10. The method of claim 9 wherein causing the plurality of intrusive activity detection rules to be used to detect subsequent intrusive activities comprises:

applying the trained machine learning model to a new data set characterizing a new activity; and obtaining an output of the trained machine learning model, the output indicating whether the new activity is intrusive.

11. A system comprising:

a memory device; and a processing device coupled to the memory device, the processing device to perform operations comprising:

receiving, at a security platform, a plurality of data sets characterizing prior intrusive activities with respect to computing resources associated with one or more entities;

receiving, at the security platform, one or more rule generation policies each pertaining to one or more respective transformations of one or more data sets into one or more intrusive activity detection rules, wherein the one or more rule generation policies are associated with a plurality of transformation types supported by the security platform, and wherein at least one of the one or more rule generation policies defines a mapping that translates one or more of the one or more data sets in one or more first formats to one or more of the intrusive activity detection rules in one or more second formats supported by the security platform;

applying the one or more rule generation policies to the plurality of data sets characterizing the prior intrusive activities to generate a plurality of intrusive activity detection rules in the one or more second formats supported by the security platform; and causing the plurality of intrusive activity detection rules to be used to detect subsequent intrusive activities.

12. The system of claim 11, the operations further comprising:

testing a rule of the plurality of intrusive activity detection rules on a test data set to determine an intrusive activity detection false positive rate metric;

determining that the rule does not meet a false positive rate threshold criterion; and queuing the rule for security analysis by a user.

13. The system of claim 11, the operations further comprising:

receiving, at the security platform, a plurality of updated data sets characterizing the prior intrusive activities;

applying the one or more rule generation policies to the plurality of updated data sets characterizing the prior intrusive activities to generate a plurality of updated intrusive activity detection rules; and causing the plurality of updated intrusive activity detection rules to be used to detect subsequent intrusive activities.

14. The system of claim 13, wherein the plurality of updated data sets characterizing the prior intrusive activities comprise user feedback regarding one or more alerts generated by the plurality of intrusive activity detection rules.

15. The system of claim 11, wherein each of the plurality of data sets characterizing prior intrusive activities comprises at least one of: a set of time series log data associated with the prior intrusive activities, a malware binary pattern associated with the prior intrusive activities, or a user-generated template representing the prior intrusive activities.

16. A non-transitory computer-readable medium comprising instructions that, when executed by a processing device, cause the processing device to perform operations comprising:

receiving, at a security platform, a plurality of data sets characterizing prior intrusive activities with respect to computing resources associated with one or more entities;

receiving, at the security platform, one or more rule generation policies each pertaining to one or more respective transformations of one or more data sets into one or more intrusive activity detection rules, wherein the one or more rule generation policies are associated with a plurality of transformation types supported by the security platform, and wherein at least one of the one or more rule generation policies defines a mapping that translates one or more of the one or more data sets in one or more first formats to one or more of the intrusive activity detection rules in one or more second formats supported by the security platform;

applying the one or more rule generation policies to the plurality of data sets characterizing the prior intrusive activities to generate a plurality of intrusive activity detection rules in the one or more second formats supported by the security platform; and causing the plurality of intrusive activity detection rules to be used to detect subsequent intrusive activities.

17. The non-transitory computer-readable medium of claim 16, wherein each of the one or more data sets comprises a plurality of source rules in the one or more first formats, and wherein the mapping translates the plurality of source rules in the one or more first formats to the one or more intrusive activity detection rules in the one or more second formats.

18. The non-transitory computer-readable medium of claim 16, wherein the plurality of transformation types include at least two of:

a template that maps data sets to intrusive activity detection rules;

an algorithm that ingests data sets to generate rules; or an algorithm that translates source rules to intrusive activity detection rules.

19. The non-transitory computer-readable medium of claim 16, wherein:

at least one of the plurality of intrusive activity detection rules corresponds to a machine learning model;

at least one of the one or more rule generation policies defines a set of features and respective labels in the plurality of data sets characterizing prior intrusive activities that are to be used to train the machine learning model, wherein each label of the respective labels indicates presence or absence of intrusive activity in one or more corresponding features of the set of features; and applying the one or more rule generation policies to the plurality of data sets characterizing prior intrusive activities comprises training the machine learning model using training data comprising:

the set of features representing training inputs; and the respective labels representing target outputs for the training inputs.

20. The non-transitory computer-readable medium of claim 19 wherein causing the plurality of intrusive activity detection rules to be used to detect subsequent intrusive activities comprises:

applying the trained machine learning model to a new data set characterizing a new activity; and obtaining an output of the trained machine learning model, the output indicating whether the new activity is intrusive.

* * * * *